US006234690B1

United States Patent
Lemieux

(10) Patent No.: US 6,234,690 B1
(45) Date of Patent: May 22, 2001

(54) CAMERA QUICK-RELEASE DEVICE

(76) Inventor: Frank Lemieux, Seehof Str. 42 14167, Berlin (DE)

(*) Notice: Subject to any disclaimer, the term of this patent is extended or adjusted under 35 U.S.C. 154(b) by 0 days.

(21) Appl. No.: 09/136,921

(22) Filed: Aug. 20, 1998

(51) Int. Cl.$^7$ .............................. G03B 17/00; F16M 11/04

(52) U.S. Cl. ........................ 396/419; 396/428; 248/187.1

(58) Field of Search .................................... 396/419, 428; 248/177.1, 178.1, 187.1

(56) References Cited

U.S. PATENT DOCUMENTS

| | | | |
|---|---|---|---|
| 2,823,003 | * 2/1958 | Puggard | 396/419 X |
| 4,525,052 | 6/1985 | Kosugi et al. . | |
| 4,795,118 | 1/1989 | Kosugi et al. . | |
| 4,929,973 | 5/1990 | Nakatani . | |
| 5,333,023 | * 7/1994 | Oxford | 396/428 |
| 5,870,642 | * 2/1999 | Mittelstaedt et al. | 396/428 |

* cited by examiner

Primary Examiner—Alan A. Mathews

(57) ABSTRACT

An improved quick-release coupling for a tripod panhead and the like includes a base (1) (see FIGS. 3 & 4) and a releasable shoe (2). The base is attached to the shoe by manually depressing a locking button (5) against the force of compression spring (7), which allows locking ball (6) to retract into groove (5+sc b) of the locking button, and then further depressing a fixing/releasing button (3) against force of a compression spring (8), so that retaining screw (4) retracts into the base and allows the shoe to be placed over the base flat area (1+sc b). When manual pressure on the fixing/releasing button is released, the retaining screw moves outward by the force of the compression spring, and together with the stationary retaining screws (4+sc a), engage appropriate concavities in the interior wall of the recess of the shoe. The fixing of the shoe to the base is automatically locked against accidental release when manual pressure on the locking button is released, by the action of a spring (7) against the locking button, which causes a shoulder (5+sc c) on the locking button to force the locking ball downward in its bore (6+sc a), and to protrude from, and thus prevent the rearward travel of, the fixing/releasing button, and thus the retaining screw. Concavities in the interior wall of the recess of the shoe are provided such that the shoe can be releasably attached to the base in any of 12 discrete and equally-spaced rotational orientations, facilitating its general ease of use as well as its adaptation to composite panoramic photography or imagery.

10 Claims, 6 Drawing Sheets

CAMERA QUICK-RELEASE DEVICE

BACKGROUND

1. Field of the Invention

The present invention pertains to the field of couplings suitable for the rapid fixing and releasing of optical instruments such as still and video cameras, to supporting devices such as tripods, and more particularly to the type of coupling having a releasable shoe which is attached to a camera, and a base attached to the tripod, and a means on the base allowing for the rapid mounting and release of the shoe/instrument to and from the tripod.

2. Description of the Prior Art

Optical instruments are commonly provided on their bottom surface with a standardized screw hole by which they may be mounted to a supporting device, such as a tripod. However, the operation of screwing and unscrewing the camera or other optical instrument to the supporting device is so inconvenient and time consuming as to render the use of a tripod or other supporting device impractical or cumbersome in any situation where setup speed is critical.

There are known in the prior art many designs which aim to increase the convenience and utility of camera supporting devices by providing a means for allowing the quick attachment and detachment of the camera to and from the supporting device. The various existing designs are either integral to a panhead or adapted to be mounted atop a panhead. All of the designs feature two parts: a shoe or a stud affixed to the screwhole on the bottom of the camera or other optical instrument and intended to largely remain so affixed, and a base integral to, or mountable atop a tripod panhead, which base incorporates a means for quickly fixing and releasing the shoe/stud to, and from the base.

A design frequently encountered in the prior art features a rectangular shoe, at least two opposing parallel edges of which are formed in an incline outwardly toward the bottom of the shoe, and a fixing/releasing means on the base comprising a clamp in the form of a channel with two inclined walls, one stationary and the other inwardly and outwardly movable. The shoe/camera is aligned with an open end of the channel-shaped base and then slid in to fully engage the inclined walls. The shoe/camera is then secured by manually tightening a knob provided on the base, which moves an inclined wall of the base against its opposing wall, effectively clamping the shoe. The shoe/camera is released by reversing the mounting procedure.

Although this common design is simple and easy to manufacture, it suffers some serious shortcomings in convenience and security. The fact that the shoe must first be aligned with an open end of the channel, and then pushed and guided into the base prior to mounting; and that the shoe must be clamped to the base by a screwing operation, the security of which is dependent on the degree of manual tightening, greatly reduces any advantage the device may have as a "quick"-release.

Disclosed in U.S. Pat. No. 4,929,973 to Nakatani, is a panhead with a quick-release device, the basic type and operation of which is common to many designs. This type of device features a rectangular receptacle defined in the top of the panhead which is closed on three sides and open along the forth side, and a shoe which is of a generally square or rectangular shape, and having edges inclined outwardly toward the bottom. The shoe, which is attachable to the underside of a camera, fits into the panhead receptacle. The shoe/camera can be secured therein by means of a pivotable shoe locking lever mounted on the open side of the receptacle and by means of which the shoe may be selectively secured or released, thereby allowing for the quick attachment or release of the camera to or from the panhead. However, in this prior-art quick-release and in many others of similar design, the camera/shoe can be oriented to the receptacle prior to attachment, in at most two distinct positions. The care thus required to correctly position the camera/shoe prior to attachment slows the process of affixing the camera to the supporting device. In addition, the pivoting shoe locking lever of this prior-art quick-release and many of its type must, after the placement of the shoe into the tray, be manually pushed further in the locking direction in order to ensure a secure connection. In this, and in the previously discussed prior-art quick-release, the shoe features outwardly inclined edges which are exposed and thus vulnerable to damage when not mounted in the base tray or receptacle. Also, the outwardly inclined edges of the shoes of quick-release devices of this type present a protrusion which can easily snag on clothing, straps, equipment bags, etc.

Disclosed in U.S. Pat. No. 4,795,118 to Kosugi, is a panhead which incorporates a quick-release device, the shoe of which comprises inwardly-formed working surfaces which are thus not vulnerable to damage and snagging. However, this design suffers shortcomings. After the shoe is attached to the base, a separate and distinct manual operation is required to firmly lock it. Also, this device is of such size and complexity as to be only suitable for being integral to a panhead. Furthermore, the utility and convenience of the quick-release component of this device is compromised by the fact that the shoe can be attached to, and released from the base in but a single distinct and narrowly-ranged rotational position.

The previously described prior-art quick releases have shortcomings inherent in their respective designs, as well as some shortcomings they share. The devices of Nakatani and Kosugi, as well as any of the frequently encountered quick release devices which allow the joining of the shoe to the base in few orientations only, feature shoes which are attached to the camera with a separate screw, which hinders the quick removal of the shoe from the camera should the need arise. A separate camera screw must be used, because if in the interest of ease of removal, the shoe and the camera screw were formed as a unit, the rotational orientation of the shoe with respect to the camera would, upon tightening, be entirely arbitrary. However, since the shoes of the previously described quick-releases can mate with their respective bases only in few distinct positions, an arbitrary shoe-to-camera orientation would be confusing and unacceptable, especially if one were to use two or more shoe/camera combinations on the same base/tripod—a situation common in photography. In addition, the limitation of possible mounting positions slows the shoe-to-base coupling operation by forcing the photographer to visually confirm alignment while guiding the camera/shoe to its receptacle. This is a critical drawback to a photographer intent on keeping an eye on the subject while setting up equipment.

OBJECTS AND ADVANTAGES

Accordingly, several objects and advantages of the present invention are:

- to provide a quick-release device, the components of which may be joined to each other in a multitude of possible rotational orientations;
- to provide a quick-release device, the shoe of which features inwardly-formed engaging surfaces, which are thus unsusceptible to damage and fouling as well as unlikely to snag clothing, equipment bags, and the like;

to provide a quick-release device, the components of which may be quickly and easily removed from the optical device (or the like) and from the supporting device without the use of tools, or a separate screw;

to provide a quick-release device, the components of which are of such simplicity and compactness as to be readily adaptable for mounting atop virally any optical device and panhead;

to provide a quick-release device which includes a fixed position which is mechanically locked against accidental release, and which locking is accomplished automatically and without additional manual operations;

to provide a quick-release device of such ease of use that it can be reliably operated by feel alone, i.e., without the necessity of visual confirmation of shoe-to-base orientation prior to attaching.

A further object and advantage of the present invention is to provide a quick-release device which allows for a multitude of possible locking rotational orientations between the camera/shoe and the base/panhead, each of which orientations is so spaced as to enable, by the consecutive engagement of orientations or combination of orientations, composite panoramic photography or imagery, or other applications requiring similar rotational indexing of an optical device. Still further objects and advantages of the present invention will become apparent from a consideration of the drawings and the ensuing description.

REFERENCE NUMERALS

Figure 1:
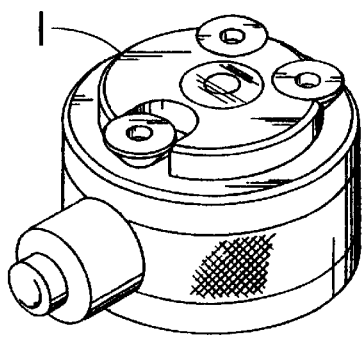
FIG. 1 is a perspective view of a preferred embodiment of a quick-release device according to the present invention.
Figure 2:
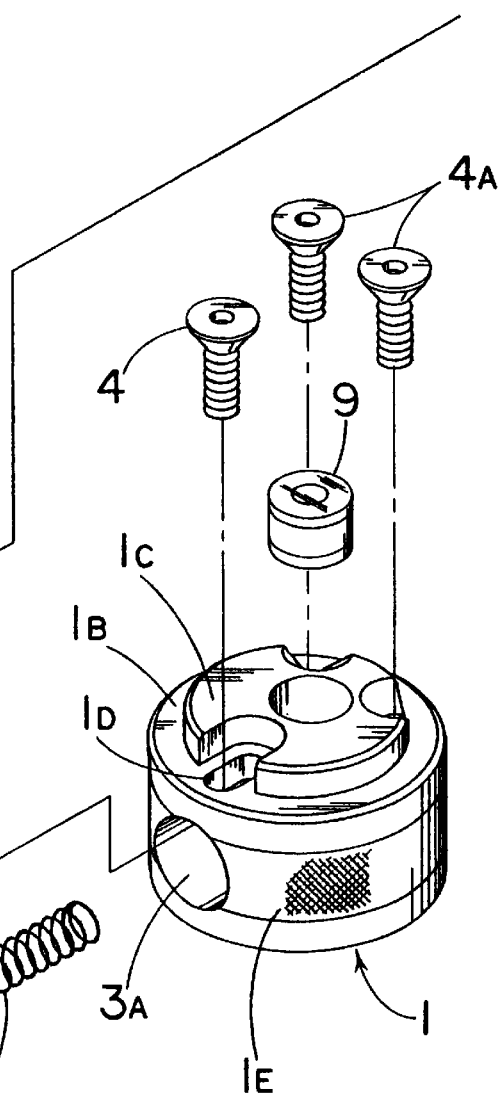
FIG. 2 is an exploded perspective view of the device shown in FIG. 1.

| | |
|---|---|
| 1. | base |
| 1A. | threaded socket (for panhead) |
| 1B. | flat area (base) |
| 1C. | circular boss (base) |
| 1D. | slot |
| 1E. | knurl (base) |
| 2. | shoe |
| 2A. | screwthread (for camera) |
| 2B. | resilient friction material |
| 3. | fixing/releasing button |
| 3A. | stepped bore |
| 4. | retaining screw (movable) |
| 4A. | retaining screws (stationary) |
| 5. | locking button |
| 5A. | blind bore (for locking button) |
| 5B. | groove |
| 5C. | shoulder |
| 6. | locking ball |
| 6A. | bore (for locking ball) |
| 7. | compression spring (locking button) |
| 8. | main compression spring |
| 9. | spirit level |
| 10. | inclined retaining means (base) |
| 10A. | L-sectioned interior wall |
| 11. | inwardly inclined interior wall (shoe) |
| 11A. | L-sectioned retaining means (base) |
| 12. | grooved coupling shoe |
| 12A. | camera screw |
| 13. | setscrews |
| 13A. | threaded setscrew holes |
| 20. | camera (not part of invention) |
| 20A. | camera screwhole (not part of invention) |
| 21. | panhead base (not part of invention) |
| 21A. | camera screw (not part of invention) |
| 22. | panhead (not part of invention) |
| 30. | equally-spaced radial serrations (shoe) |
| 30A. | equally-spaced radial serrations (base) |

DETAILED DESCRIPTION OF THE PREFERRED EMBODIMENTS

Referring now to FIGS. 1 to 9, preferred embodiments of the device according to the present invention will be described.

The device includes a base 1 (see FIG. 1) at the lower end portion thereof. Base 1 is mounted to the panhead base 21 (see FIG. 8) of a conventional tripod panhead 22. A threaded socket 1a (see FIG. 3) is formed in the central bottom portion of base 1, which is adapted to mate with a standard camera mounting screw 21a (see FIG. 8), which protrudes from the panhead base 21 of a conventional tripod panhead 22. At the upper end portion of the present invention, a shoe 2 (see FIG. 1) is provided which includes on its upper middle portion, a protruding screw thread 2a (see FIG. 3) which is adapted to mate with the standard tripod screwhole 20A (see FIG. 8) found in the underside of most cameras and optical equipment.

Base 1 (see FIG. 2) comprises a cylindrical body on the upper surface of which is formed a flat area 1b, and a circular boss 1c. Two hardened-metal countersunk retaining screws 4a are fastened to the body 60 degrees apart, and at an appropriate distance, from the center of the body. A slot 1d is formed in the upper surface of the body, directly opposite screws 4a, and in which a hardened-metal countersunk retaining screw 4 can move between a locked and a released position. A spirit level 9 is mounted into the top of the body in the space between the retaining screws 4a and the slot. A blind, stepped bore 3a is formed in the side of the body and in line with the slot 1d, and in which a fixing/releasing button 3 is slidably mounted. Retaining screw 4 is fixedly attached to the fixing/releasing button through the slot 1d. The fixing/releasing button 3, and thus the retaining screw 4, is held in the fixed position (see FIG. 3) by the force of a main compression spring 8. The fixing/releasing button 3 comprises in its front portion a locking button 5, a compression spring 7, and a locking ball 6. The locking button 5 is slidably mounted in a blind bore 5a (see FIG. 2) formed in the outer end of the fixing/releasing button 3. The locking button 5 (see FIG. 3) has a circumferential groove 5b, and a circumferential shoulder 5c formed on its outer periphery, and a bore to accept a compression spring 7. Locking ball 6 is slidably mounted in a throughbore 6a, formed in the underside of the fixing/releasing button. The locking ball is retained in its bore on its upstroke by the locking button, and on its downstroke by a dimple formed around the bottom outer edge of the bore.

Shoe 2 (see FIG. 1) is disc-shaped and constructed of a single piece of hardened metal. A circular recess is formed in the bottom surface of the shoe. Twelve equally-spaced concavities, the size and shape of which match a vertical section of the countersunk-head portion of base retaining screws 4 & 4a, are formed along a circumference of the interior wall of the recess. A resilient friction material 2b (see FIG. 3) is bonded to the upper surface of the shoe, which serves to protect the finish of the camera or other device to which it is mounted, and to prevent inadvertent slippage. A knurl is formed around the outer periphery of the shoe to assist the installation on, and removal from the camera or other device.

Operation of the Invention

The operation of the quick-release device constructed in this manner will now be described.

Figure 4:
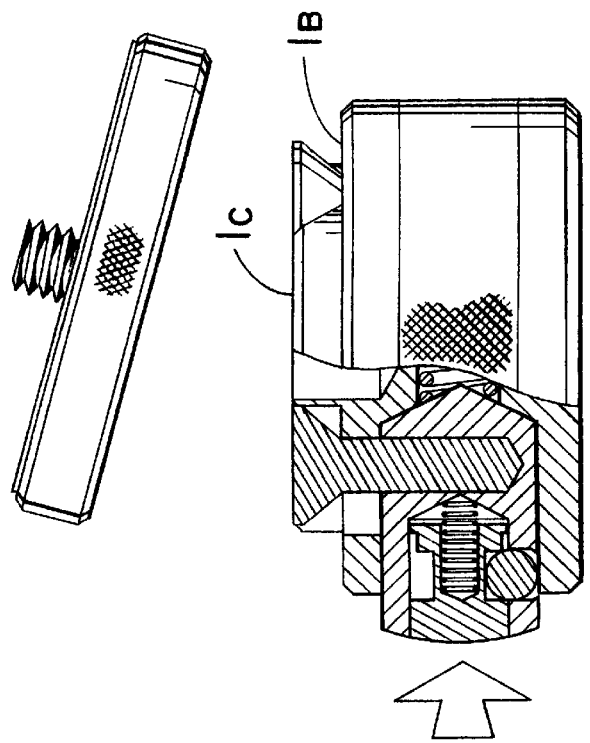
FIG. 4 is a longitudinal view, partially in section, of the device shown in FIG. 1, illustrating the released position.
Figure 3:
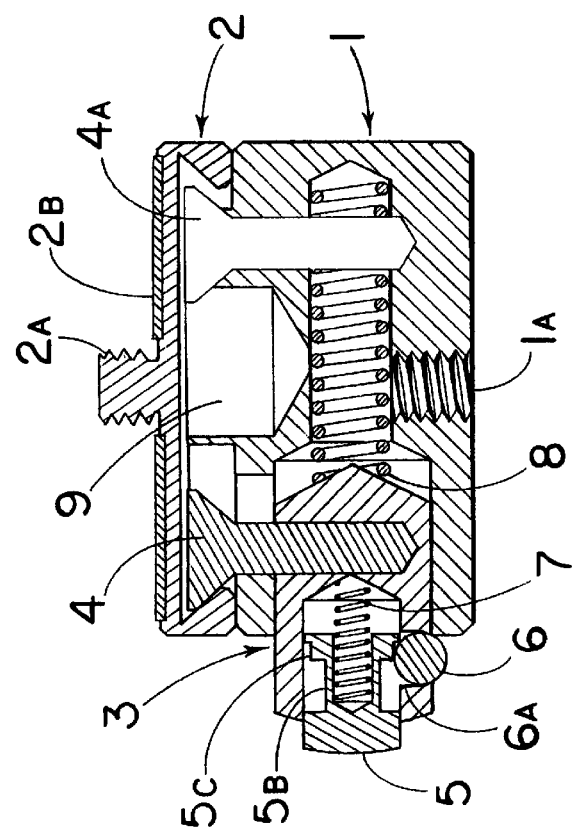
FIG. 3 is a longitudinal sectional view of the device shown in FIG. 1, illustrating the locked position.
Figure 5:
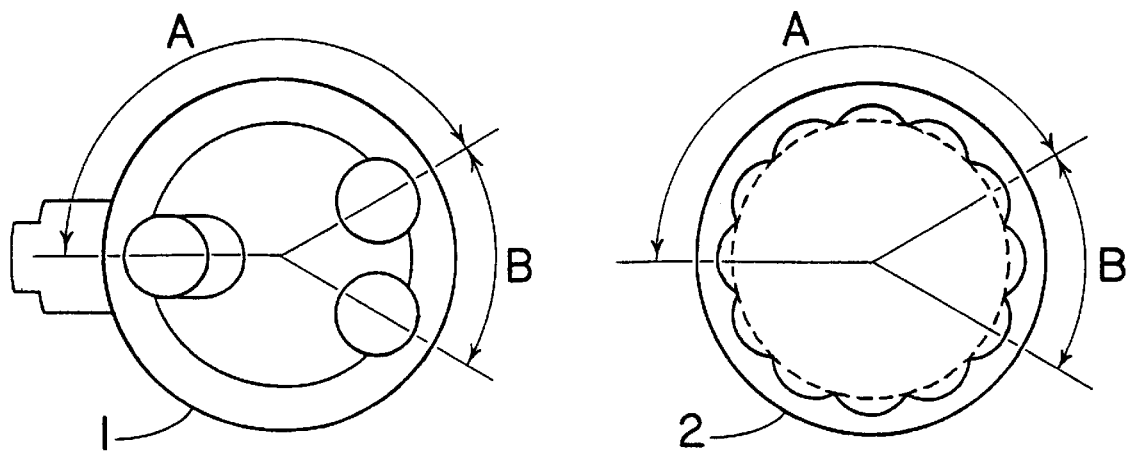
FIG. 5 is a plan view illustrating the angular relation of the concavity-to-protrusion radial engagement points of the base and shoe of the device shown in FIG. 1.

The coupling operation is as follows: the fixing/releasing button is fully depressed and held in the released position (see FIG. 4). A camera (not shown) with shoe attached is then lowered onto the base until the bottom of the shoe is approximately resting on the flat surface 1b (see FIG. 4 & FIG. 2) of the base. The circular boss 1c of the base fits freely into the recess of the shoe and serves to roughly center the shoe on the base and thus prevent the engagement of the base retaining screws with inappropriate concavities in the shoe. The fixing/releasing button is then fully released and, if necessary, the camera/shoe is rotated slightly in order to enable the retaining screws 4 & 4a to engage the appropriate concavities in the shoe. Since the angular displacement A & B (see FIG. 5) of the three retaining screws on the base match exactly the angular displacement of appropriate concavities in the shoe, and since the twelve concavities in the shoe are regularly spaced, and thus 30 degrees apart, the camera/shoe will need to be rotated with respect to the base, not more than 15 degrees in either direction to achieve positive engagement. The camera/shoe is released from the base simply by filly depressing the f/releasing button while slightly twisting and lifting the camera from the base.

The automatic locking feature operates as follows: if locking button 5 (see FIG. 3) is manually depressed against the force of compression spring 7, locking button is free to slide in bore of fixing/releasing button 3, to a position where groove 5b is lined up with bore 6a. If the locking button is further depressed, the locking ball 6 is displaced into the groove 5b, and the entire fixing/releasing button assembly is free to slide inward into the body 1, against the force of the main compression spring 8. The locking retaining screw 4 is thus moved to the released position (see FIG. 4) and the shoe may be separated from the base. If, on the other hand, manual pressure is released from the fixing/releasing button, the entire fixing/releasing button assembly, including the retaining screw 4, is moved outward by the force of the main compression spring 8 (see FIG. 3). When the fixing/releasing button has reached the end of its travel, a further release of manual pressure results in the locking button 5 sliding outward in its bore in the fixing/releasing button, by the force of the compression spring 7. As the locking button slides outward, the locking ball 6 is forced downward in its bore by the shoulder 5c of the locking button. The locking ball thus now protrudes from the lower surface of the fixing/releasing button, effectively blocking any unintended movement of the fixing/releasing button—retaining screw assembly toward the released position.

This particular embodiment of the invention has the advantage of enabling a photographer, simply by leveling the base by means of the built-in spirit level and using the standard 50 mm lens found on most SLR cameras, to photograph a composite panorama by engaging consecutive concavities of the camera shoe. This is possible because the spacing of the concavities of the shoe is 30 degrees, which is slightly less than the field of view of the standard 50 mm lens. A desirable overlap between successive frames, which may be subsequently trimmed, is thus achieved. The embodiment previously described has the added advantage of rebuildabilty—should the contact areas of the base retaining screws wear out or become damaged, they can be easily and inexpensively replaced.

Figure 6:
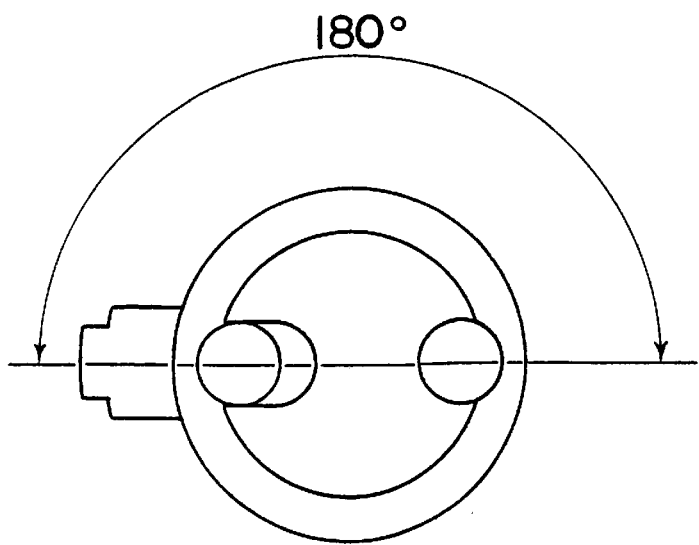
FIG. 6 is a plan view of the layout of the base retaining means of an alternative embodiment of a device according to the present invention.

FIG. 6 shows an alternative embodiment of a device according to the present invention. The retaining means comprises one stationary and one movable screw (or pin or protrusion, etc.), arranged 180 degrees apart. The manner of operation of this embodiment is similar to that of the preferred embodiment, previously described.

Figure 7:
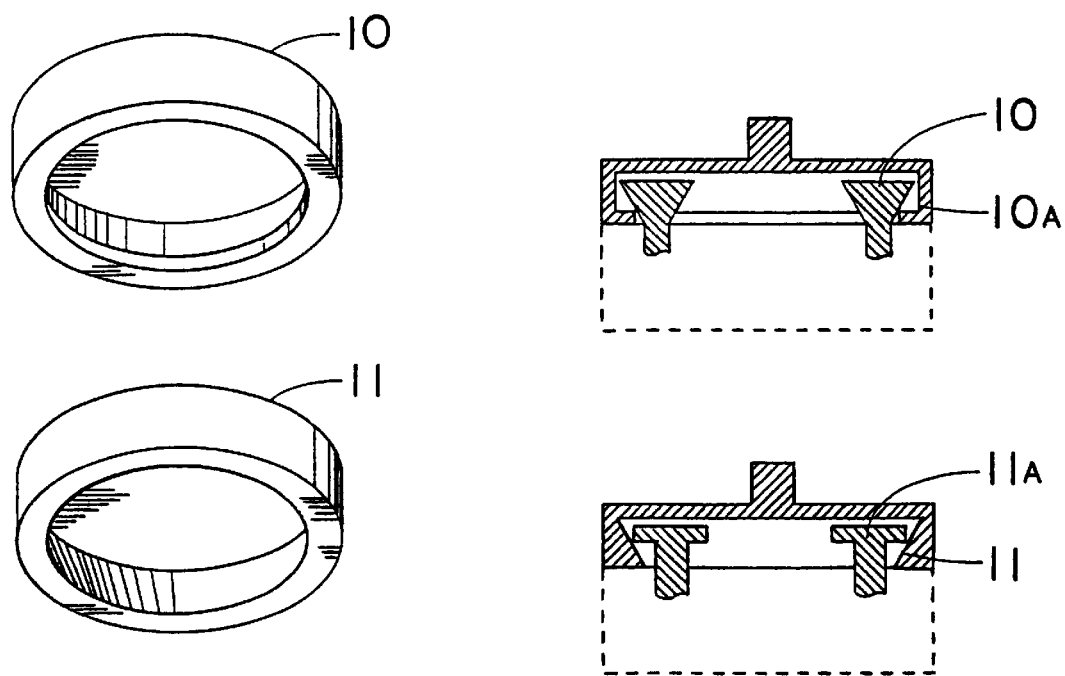
FIG. 7 shows perspective and sectional views of two alternative embodiments of a device according to the present invention, with respect to the arrangement of the inclined engaging surfaces of their retaining means.

FIG. 7 shows two alternative arrangements of the shoe-to-base retaining means' engaging surfaces. Number 10 shows a shoe with an L-sectioned interior wall engaging with a base retaining means 10a, which is formed in an incline. Number 11 shows a shoe with an incline-sectioned interior wall which incline engages with an inverted L-sectioned protrusion 11a on the base. The coupling shoes can have their interior walls formed with or without discrete concavities; in the case of a shoe having no concavities formed in its interior wall, relative lateral rotation between the shoe and the base can otherwise be arrested by radial serrations or the like, formed on the bottom of the shoe, which are adapted to mesh with similar serrations formed on the base (see area denoted by 30 & 30a in FIG. 9). The degree intervals of the serrations may be dimensioned so that the panorama indexing feature is retained, and the sides of the base and shoe appropriately marked for reference to aid such indexing.

Figure 8:
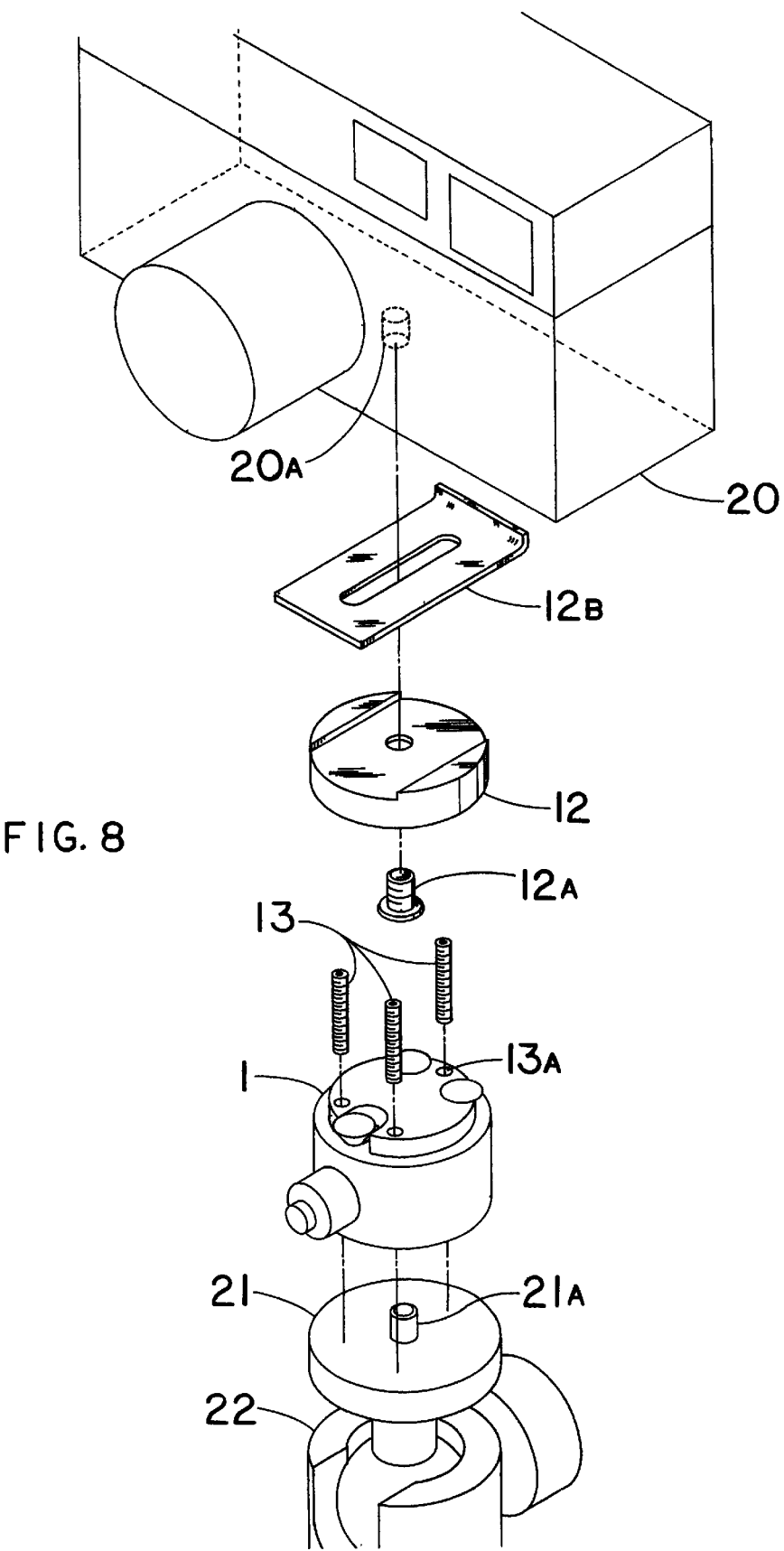
FIG. 8 is a perspective view of an alternative embodiment of a device according to the present invention, illustrating its relation to a camera and a panhead.

FIG. 8 shows a device according to the present invention with some modifications which enable the shoe-to-camera and the base-to-panhead connections to be more permanent and secure. Number 12 shows the coupling shoe with a groove machined into its top surface in which a metal plate 12b may slide. A hole is formed in the middle of the shoe which is adapted to fit a camera screw 12a. Plate 12b has a longitudinal slot formed in its middle, which is adapted to accept screw 12a and one upturned edge. Base 1 has threaded holes 13a, which pass through the body, and into which fit setscrews 13. The modifications operate as follows: plate 12b is placed in the groove of shoe 12; camera screw 12a is passed through the shoe and the slot in the plate, and then loosely threaded into the standard camera screw socket 20a in the underside of camera 20; plate 12b is then adjusted so that its upturned edge firmly abuts against an appropriate vertical edge of the camera; the camera screw 12a is then firmly tightened. The upturned edge of plate 12b, when thus held firmly against an edge of the camera and within the groove of the shoe 12, positively prevents the inadvertent loosening of the shoe from the camera. The base 1 is secured to the panhead by rotating the entire base onto the standard camera screw 21a until it is tight against panhead base 21. Setscrews 13 are then simply tightened against panhead base 21, assuring a secure, slip-proof connection.

Figure 9:
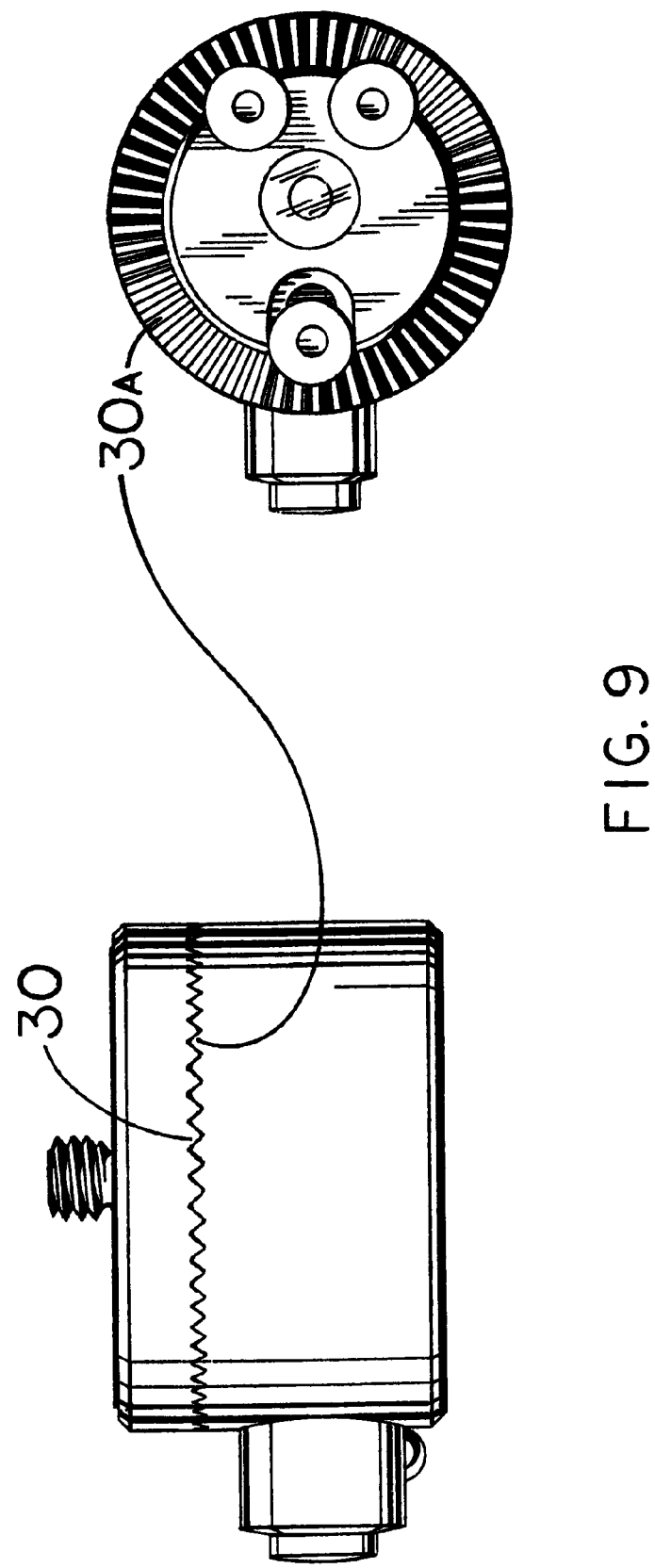
FIG. 9 shows the "equally-spaced radial serrations" on the shoe and the base of an alternative embodiment of a device according to the present invention.

FIG. 9 shows radial serrations formed on the shoe and the base of an alternative embodiment of a device according to the present invention.

Conclusion, Ramifications, and Scope

It will be apparent that the device of the invention thus described offers a significant improvement over the prior art. Its unique design offers a number of advantages over the conventional quick-release:

- the multiple mounting positions the device allows for, permits a photographer to quickly attach a camera to a support device without visual confirmation, i.e., by feel alone so as not to divert attention from the subject;
- the device is very compact and unobtrusive: the shoe can also be attached to compact "point-and-shoot" cameras; and unused shoes, which may be no larger than a coin, can also be stored in a wallet, or a pocket—hardly practical with the shoe portion of devices of the prior art;

the shoe and the base, the retaining means of the base, the fixing/releasing button—in fact all the exposed components of the device are rounded, presenting no sharp edges to snag clothing and equipment bags, etc. In addition, the shoe features internal engagement areas, which cannot snag and are invulnerable to damage and fouling;

- provides for automatic, mechanical locking of the shoe to the base simply by releasing the fixing/releasing button;
- provides for easy and inexpensive replacement of damaged or worn base retaining means simply by replacing the retaining screws;
- both shoe and the base can be quickly removed from the camera and the support device respectively, without tools. This allows for the quick attachment of accessories such as a flash bracket or motor drive, etc.;
- provides a means for facilitating composite panoramic photography, or for other applications requiring the sequential, positive, discrete, and repeatable radial aiming of an optical device with respect to its supporting device.

In addition to offering advantages to the conventional quick-release in terms of convenience, compactness, unobtrusiveness, security, and panorama indexing, the device of the present invention opens up new possibilities for the uses of a quick-release. For example, if the shoe of the present invention is mounted, via a 90-degree bracket, to a camera such that it is oriented vertically with respect to the camera body, and so that its center is in line with the center of the lens, a multiple exposure kaleidoscopic photograph can be taken by means familiar to those skilled in the field.

The device of the present invention has been described in detail with respect to optical instruments such as cameras, but the device can also be applied for supporting a variety of apparatus which must be coupled and uncoupled and/or rotationally indexed to a base with rapidity and security. As will be understood by those familiar with the art, the device according to the present invention may be embodied in other specific forms without departing from its spirit or essential characteristics. For example, the "retaining means" of the base need not be the screws as illustrated, but may be pins, or any of a range of protrusions cast or otherwise formed into the base which would serve an identical function. Accordingly, the disclosure of the preferred embodiments of the present invention is intended to be illustrative, but not limiting, of the scope of the invention which is set forth in the following claims and their legal equivalents.

I claim:

1. In a coupling of the type suitable for the rapid mounting and removal of an optical instrument to and from a supporting device; said coupling comprising a shoe attachable to said optical instrument, a base attachable to said supporting device, and a fixing/releasing means movable between a fixed position and a released position for releasably fixing said shoe to said base, the improvement wherein:

said shoe comprises, on a lower surface thereof, a substantially circular recess defining an interior wall, and a substantially circular aperture defining a lower edge of said interior wall;

inwardly-formed retaining means extending along a circumference of said interior wall, the retaining means having first engaging surfaces;

said base including on an upper end thereof, said fixing/releasing means comprising a plurality of lateral protrusions, having second engaging surfaces adapted to engage outwardly against said first engaging surfaces of said retaining means of said shoe when said fixing/releasing means is in said fixed position, and at least one of said lateral protrusions is laterally movable between an outwardly fixed and an inwardly released position.

2. The improvement of claim 1, wherein said retaining means of said shoe comprises a plurality of equally spaced concavities;

the angular spacing between said concavities define a discrete shoe-to-base rotational orientation so that, through the selective engagement of said lateral protrusions of said base with said concavities, or combination of said concavities, an optical instrument can be releasably fixed to said base in a series of discrete positions relative to said base, facilitating indexing suitable to sequential photography or imagery.

3. The improvement of claim 1, wherein said interior wall of said shoe is continuously inwardly-inclined.

4. The improvement of claim 1, wherein said interior wall of said shoe is substantially L-shaped in section.

5. The improvement of claim 1, wherein said shoe includes on a bottom side thereof, a first mating surface concentric with, and coplanar to, said circular aperture, and equally-spaced serrations formed radially on said first mating surface;

said base includes, on an upper end thereof a second mating surface, with equally-spaced serrations formed radially thereon, adapted to mesh with the serrations on said first mating surface of said shoe when said shoe is releasably fixed to said base, so that rotational movement of said shoe relative to said base is arrested.

6. The improvement of claim 5, wherein the intervals between said equally-spaced serrations are dimensioned to define a discrete shoe-to-base rotational orientation so that, through the selective engagement of said serrations, singly or in combination, an optical instrument can be releasably fixed in a series of consecutive, discrete positions relative to said base, facilitating indexing suitable to sequential photography or imagery.

7. The improvement of claim 1, wherein said laterally movable protrusion is moved outwardly toward said fixed position by the urging force of a spring means, and is moved inwardly toward said released position by an external force opposing said urging force of said spring means.

8. The improvement of claim 7, wherein said fixing/releasing means includes means for locking said laterally movable protrusion in said fixed position when said external force opposing said urging force of said spring means is released, and for unlocking said laterally movable protrusion when said external force is applied.

9. The improvement of claim 7, wherein a plurality of said first and said second engaging surfaces on said shoe retaining means and said lateral protrusions of said fixing/releasing means of said base are formed in an incline, so that said urging force of said spring means cooperates with said incline to snugly fix said shoe to said base when said fixing/releasing means is in said fixed position.

10. The improvement of claim 1, wherein a plurality of said first and said second engaging surfaces on said shoe retaining means and said lateral protrusions of said fixing/releasing means of said base are formed in an incline, so that said outward movement of said laterally movable protrusion cooperates with said incline to snugly fix said shoe to said base when said fixing/releasing means is in said fixed position.

* * * * *